March 30, 1965

C. S. SPINNEY 3,175,444

MEASURING APPARATUS HAVING A CARRIAGE ADVANCING TO FEED
WORKPIECE AND ROLLER MEANS FEEDING WORKPIECE
WHILE CARRIAGE IS RETRACTING

Filed March 7, 1962

INVENTOR.
Clayton S. Spinney
BY
Roberts, Cushman & Grover
ATT'YS

United States Patent Office 3,175,444
Patented Mar. 30, 1965

3,175,444
MEASURING APPARATUS HAVING A CARRIAGE ADVANCING TO FEED WORKPIECE AND ROLLER MEANS FEEDING WORKPIECE WHILE CARRIAGE IS RETRACTING
Clayton S. Spinney, Greenland, N.H., assignor to The Morley Company, Portsmouth, N.H., a corporation of Maine
Filed Mar. 7, 1962, Ser. No. 178,084
1 Claim. (Cl. 83—251)

This invention relates to apparatus for measuring predetermined lengths of elongate flexible material, such as rope and strips of sheet material, and has for its objects the provision of apparatus which is simple and economical in construction, which need not be rethreaded after each length is measured and cut off, which is readily adjustable to different lengths and which is durable and reliable in use.

According to this invention the apparatus comprises a carriage movable back and forth from a retracted position to an advanced position, the carriage having a pulley or other guide for the material, in combination with means for guiding the material to and from the aforesaid guide along a predetermined path including an entry portion and an exit portion, means in the exit portion for holding the material while the carriage is advancing to pull in additional material, and means in the exit portion for feeding the material and taking up slack while the carriage is retracting. Preferably the apparatus also has means in the aforesaid entry portion for holding the material while the carriage is retracting. This last means may comprise merely a friction brake on the reel from which the material is fed. Indeed if the aforesaid means in the exit portion for feeding the material is synchronized with the movement of the carriage no holding means is required in the entry portion of the path of the material. The means for moving the carriage back and forth includes an actuator movable between operative and inoperative position, the aforesaid holding means being controlled by the actuator so that the material is held in the exit portion while the carriage is advancing and is held in the entry portion while the carriage is retracted. In the preferred embodiment the actuator comprises a foot treadle but it may comprise a part of electrical, mechanical or pneumatic means for actuating the carriage.

For the purpose of illustration a typical embodiment of the invention is shown in the accompanying drawing in which FIG. 1 is a front elevation showing the aforesaid carriage in retracted position in full lines and in advanced position in broken lines;

Figure 1:
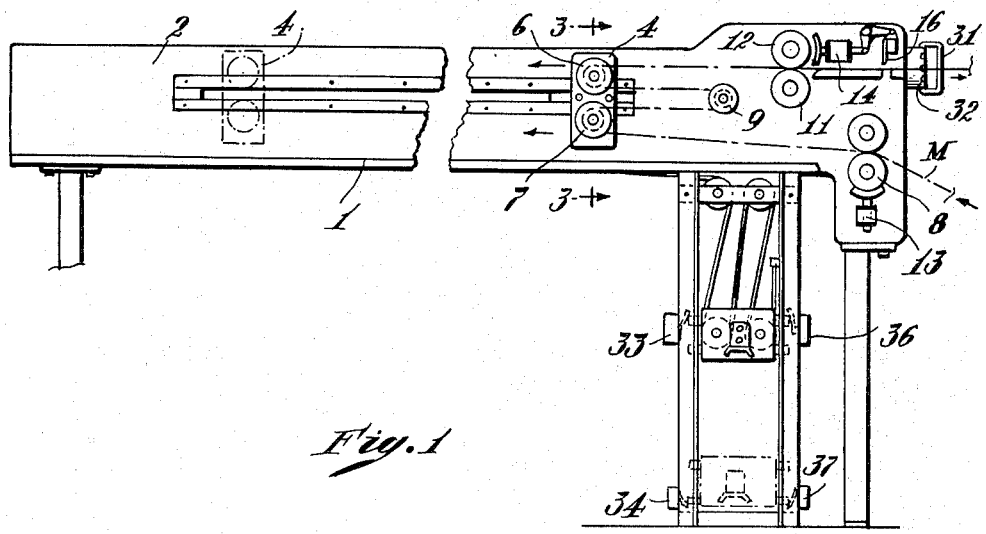

The particular embodiment of the invention chosen for the purpose of illustration comprises a table 1 having an upright back 2 containing a longitudinal slot 3. A carriage 4 is slidable back and forth in the slot 3 from a retracted position shown in full lines in FIGS. 1 and 2 to an advanced position shown in broken lines in FIG. 1. Projecting forwardly from the carriage are two rollers 6 and 7 and journaled in the back 2 are four rollers 8, 9, 11 and 12. The roller 8 has a brake moved into braking position by solenoid 13 and the roller 12 has a brake moved into braking position by a solenoid 14 which also operates a cutter 16. The material M to be measured is fed from a suitable source over the roller 8, thence over rollers 7, 9 and 6 and thence between the rollers 11 and 12, the latter being frictionally driven to pull the material from the aforesaid reel.

The carriage 4 is moved from retracted to advanced position by means of a foot treadle 17 and a cable 18 trained over rollers 19, 21, 22, 23, 24 and 26. A spring 27 connected to the roller 24 returns the carriage from advanced to retracted position when pressure is removed from the foot treadle.

Figure 2:
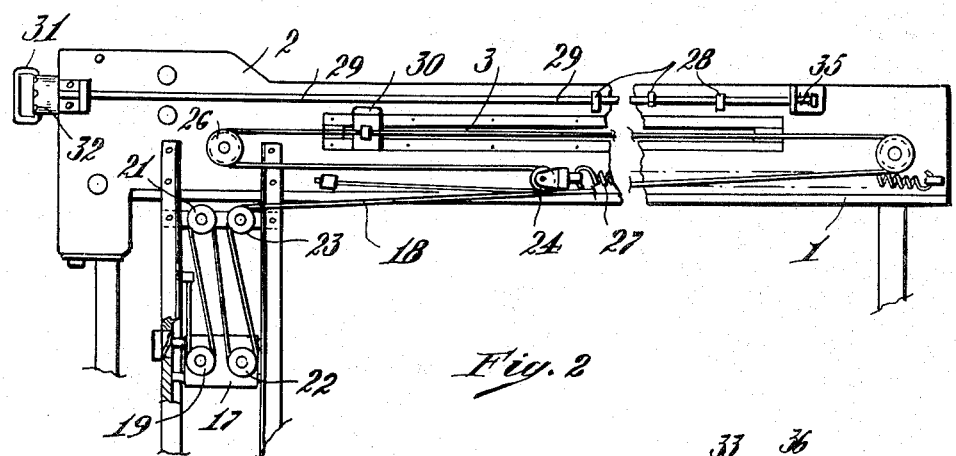
FIG. 2 is a rear elevation.
Figure 3:
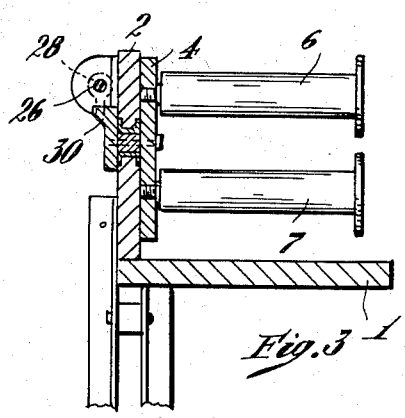
FIG. 3 is a section on line 3—3 of FIG. 1.
Figure 4:
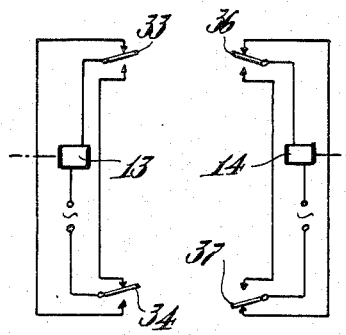
FIG. 4 is a circuit diagram.

The extent to which the carriage may be advanced is limited by stops 28 mounted on a rod 29 controlled by handle 31 which may be turned to different positions to bring the different stops respectively into the path of protuberance 30 on the back of the carriage (FIG. 2). The handle seats in recesses 32 and is yieldingly held in these recesses by a spring 35.

The solenoid 13 is controlled by two 3-way switches 33 and 34 and the solenoid 14 is controlled by two 3-way switches 36 and 37. The position of each of the switches 33 and 36 is reversed when the foot treadle reaches uppermost position and each of the switches 34 and 37 is reversed when the treadle reaches the bottom position shown in broken lines in FIG. 1. While the treadle moves down the solenoid 14 is energized to prevent rotation of the frictionally-driven roller 12. Thus the exit end of the material is pinched between the two stationary rollers 11 and 12 and held against retrograde movement. As the carriage moves from retracted position to advanced position a new length of material M is drawn from the reel. When the treadle reaches lowermost position the solenoid 14 is de-energized to release the roller 12 and the solenoid 13 is energized to brake the roller 8. Thus, while the treadle is rising and the carriage is returning to the retracted position shown in full lines in FIG. 1, the roller 12 feeds the material from the device. By driving the roller frictionally the material is fed at the proper rate to take up the slack and keep the material taut. When the treadle returns to uppermost position the solenoid 13 is again de-energized to permit the roller 8 to rotate and the solenoid 14 is energized to stop the rotation of drive roller 12 and cut off the measured length of material with the knife 16.

It should be understood that the present disclosure is for the purpose of illustration only and that this invention includes all modifications and equivalents which fall within the scope of the appended claim.

I claim:

For measuring a predetermined length of elongate flexible material, apparatus comprising a carriage movable back and forth from a retracted position to an advanced position, the carriage having a guide for said material, means for guiding the material to and from said guide along a predetermined path including an entry portion and an exit portion, a feed roller in said exit portion for feeding the material to take up slack while the carriage is retracting, a brake for stopping said roller and holding the material while the carriage is advancing to pull in additional material, a cutter located along said path beyond said roller for cutting off a measured length of material while said roller is held as aforesaid, and means for operating said brake and cutter conjointly.

References Cited by the Examiner

UNITED STATES PATENTS

| | | | |
|---|---|---|---|
| 448,663 | 3/91 | Moore et al. | 312—38 |
| 1,218,418 | 3/17 | Kusterer et al. | 83—277 |
| 1,261,310 | 4/18 | Smith | 83—277 |
| 1,941,597 | 1/34 | Cavagnaro | 33—129 X |
| 2,703,447 | 3/55 | Rosenbaum | 33—127 |
| 2,962,239 | 11/60 | Loewe | 188—63 |
| 3,060,775 | 10/62 | Dreher | 83—510 |

FOREIGN PATENTS 1,160,269 2/58 France.

ANDREW R. JUHASZ, *Primary Examiner.*

ISAAC LISANN, WILLIAM W. DYER, Jr., *Examiners.*